(12) United States Patent
Vinogradov et al.

(10) Patent No.: US 8,313,033 B1
(45) Date of Patent: Nov. 20, 2012

(54) MINIMIZING SPECULAR REFLECTION IN ELECTRO-OPTICAL WORKSTATIONS HAVING OBJECT SENSORS

(75) Inventors: Igor Vinogradov, Oakdale, NY (US); Yuly Mitelman, Stony Brook, NY (US); Eric Trongone, West Babylon, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/222,264

(22) Filed: Aug. 31, 2011

(51) Int. Cl.
*G06K 7/10* (2006.01)
(52) U.S. Cl. .............. 235/470; 235/454; 235/462.14; 235/462.42
(58) Field of Classification Search .......... 235/454, 235/462.01, 462.14, 462.42, 470
See application file for complete search history.

(56) References Cited

U.S. PATENT DOCUMENTS

| | | | | |
|---|---|---|---|---|
| 6,631,845 B2 * | 10/2003 | Barkan | | 235/462.4 |
| 6,854,655 B2 * | 2/2005 | Barkan | | 235/462.4 |
| 7,611,063 B2 * | 11/2009 | Wilz et al. | | 235/462.45 |
| 7,793,842 B2 * | 9/2010 | Neeper et al. | | 235/462.2 |
| 2004/0056099 A1 * | 3/2004 | Barkan | | 235/462.39 |
| 2006/0219792 A1 * | 10/2006 | Zhu et al. | | 235/462.06 |

* cited by examiner

*Primary Examiner* — Tuyen K Vo
(74) *Attorney, Agent, or Firm* — Nong-Qiang Fan

(57) ABSTRACT

A workstation for electro-optically reading targets in a reading field of view includes an object sensing system that senses an object entering the workstation by directing object sensing light through a window at the object, and detecting return object sensing light returned from the object along an object detection path through the window over an object detection field of view of an object light sensor. A portion of the object sensing light incident on the window is reflected therefrom into the object detection field of view as a virtual hot spot that degrades object sensor performance. An optical element, e.g., an aperture stop, in the object detection path optically modifies the object detection field of view to prevent the virtual hot spot from being detected by the object light sensor.

20 Claims, 4 Drawing Sheets

MINIMIZING SPECULAR REFLECTION IN ELECTRO-OPTICAL WORKSTATIONS HAVING OBJECT SENSORS

BACKGROUND OF THE INVENTION

Moving laser beam readers or laser scanners, as well as solid-state imaging readers or imaging scanners, have both been installed in slot scanners or workstations having a horizontally and/or a generally vertically arranged window in supermarkets, warehouse clubs, department stores, and other kinds of retailers for many years, to electro-optically read targets, such as one-dimensional and two-dimensional symbols, particularly a Universal Product Code (UPC) bar code symbol, and non-symbol targets, such as driver's licenses, receipts, signatures, etc., the targets being associated with objects or products to be processed by the workstations. An operator or a customer may slide or swipe a product associated with, or bearing, a target in a moving direction across and past a window of the workstation in a swipe mode. Alternatively, the operator or the customer may momentarily present the target associated with, or borne by, the product to an approximate central region of the window in a presentation mode. The choice depends on user preference or on the layout of the workstation.

The known moving laser beam reader generally includes a laser scan engine or module for supporting an electrically energizable laser for emitting a laser beam through the window of the workstation, a focusing lens assembly for focusing the laser beam to form a beam spot having a certain size at a focal plane in a range of working distances relative to the window, an electrically energizable scan component for repetitively scanning the beam spot across a symbol target in a scan pattern, for example, a scan line or a series of scan lines, across the symbol target multiple times per second, e.g., forty times per second, a photodetector for detecting return laser light reflected and/or scattered from the symbol target through the window of the workstation over a reading field of view, and for converting the detected laser light into an analog electrical signal, and electrical signal processing circuitry including a digitizer for digitizing the analog signal. Sometimes, the laser scan engine also supports a controller or microprocessor for controlling operation of the electrical components supported by the laser scan engine, and for decoding the digitized signal based upon a specific symbology used for the symbol target.

The known imaging reader includes an imaging scan engine or module for supporting a solid-state, image sensor comprising an array of pixels or light sensors, for sensing return light returning through the window of the workstation from a target being imaged. The image sensor may be a one- or two-dimensional charge coupled device (CCD) or a complementary metal oxide semiconductor (CMOS) device, and is analogous to the image sensors used in electronic digital cameras. The target can be a symbol or a non-symbol. The imaging scan engine also supports an illuminating light system for illuminating the target with illumination light from an illumination light source, e.g., one or more light emitting diodes (LEDs), through the window of the workstation; an imaging lens assembly, e.g., one or more imaging lenses, for capturing return ambient and/or illumination light scattered and/or reflected from the target through the window of the workstation over a reading field of view and over a range of working distances; and electrical circuitry for producing electronic analog signals corresponding to the intensity of the light captured by the image sensor over the reading field of view, and for digitizing the analog signal. The imaging scan engine optionally supports a controller or microprocessor for controlling operation of the electrical components supported by the imaging scan engine, and for processing the target and/or decoding the digitized signal based upon a specific symbology when the target is a symbol.

Some workstations continuously capture and attempt to process and/or decode targets without regard to whether or not a target is actually in the reading field of view of the scan engine. However, continuous, repetitive, flashing of bright light from the LEDs of the illuminating light system in the case of the imaging scan engine, and continuous, repetitive, flashing of bright laser light from the laser in the case of the laser scan engine, consume and waste energy, degrade component lifetimes, and can be perceived as bothersome, distracting and annoying to the operators of the readers and to nearby consumers being served.

To alleviate these problems, the art has proposed periodically activating, i.e., waking-up, the scan engine with a few different approaches. For example, the scan engine can be operated with a very low duty cycle (about 10%). Thus, the scan engine wakes up for a very short period of time to scan the reading field of view and tries to detect a presence of a target therein. However, this creates sluggishness in the reader's performance and delays in decoding, which can be perceived as an engineering defect. Also, the distracting flashing laser light or illumination light is still present during the wake-up time period.

Another approach for the imaging engine tries to detect the target without energizing the illumination LEDs. However, under low ambient light conditions, for example, when a reader is located in a dark corner in a retail environment, the activation time will be slow since the exposure of the image sensor has to be very long in order to acquire an image of acceptable brightness for object detection. Again, the reader's performance is sluggish.

Still another approach is to install an object sensing system inside the workstation, for activating the scan engine, e.g., the illuminating light system, only if an object or product bearing, or associated with, a target is detected within the active reading field of view of the scan engine. The object sensing system has one or more object light sources for emitting object sensing light, typically infrared (IR) light, and at least one object sensor for sensing the return IR light reflected and/or scattered from the object over an object detection field of view. Although generally satisfactory for its intended purpose, the use of an internal object sensing system is disadvantageous, because a portion of the IR light incident on the window of the workstation is reflected therefrom back into the object detection field of view of the object sensor. This reflected portion of the IR light creates undesirable hot spots in the object detection field of view and may significantly compromise object sensor performance.

The art has proposed to eliminate hot spots caused not by the IR light, but by reflections of the illumination light off the window, by various means. For example, in the art of laser readers in which a laser beam is directed through a planar window to a symbol for reflection therefrom to a photodetector, it is known to tilt the planar window to prevent the laser beam incident on the window from reflecting back to the photodetector and compromising the detection and successful reading of the symbol. However, tilting the window, although acceptable in some applications, is not altogether desirable in other applications, for example, for an imaging reader, because the tilt angle required would be large, i.e., on the order of 45 degrees, which may be too large and difficult to implement in certain imaging readers and overly constrain the industrial design of the workstation. In the art of imaging readers, it is known to configure the window with spherical surfaces to prevent the illumination light incident on the window from reflecting back to the image sensor. This also constrains the industrial design of the workstation since, among other things, a spherical window is typically molded from plastic, and not glass.

It is desirable to have the active reading field of view of the scan engine relatively large at a near working distance or a close proximity to the window of the workstation so that the reading field of view covers the entire target. At farther working distances, it is preferred to have the reading field of view diverge slowly. A reading field of view with such characteristics is advantageously achieved by making the internal optical path between the scan engine and the window relatively long, and this is typically obtained by inserting a plurality of fold mirrors in this internal optical path to preserve a small compact volume for the workstation. However, such fold minors exacerbate the hot spot problem, because they constitute additional surfaces from which a portion of the IR light may be reflected therefrom back into the object detection field of view of the object sensor. All of these hot spots, also known as glare, are specular light, which can overload, saturate, and "blind" the object sensor, thereby additionally degrading object sensor performance.

SUMMARY OF THE INVENTION

The present invention relates to a workstation or reader for electro-optically reading targets or indicia, especially bar code symbols. The workstation includes a housing having a light-transmissive window, and a scan module mounted in the housing. The scan module includes a reading light source for directing reading light through the window at a target for return therefrom during reading; and a reading light detector for detecting return reading light from the target along a reading path through the window over a reading field of view during reading, and for generating an electrical signal indicative of the detected return reading light.

The workstation includes an object sensing system operative for sensing an object associated with the target, and for generating a trigger signal to initiate the reading. The object sensing system includes an object light source for directing object sensing light through the window at the object for return therefrom, and an object light sensor for detecting return object sensing light returned from the object along an object detection path through the window over an object detection field of view. The object detection field of view substantially overlaps the reading field of view. Advantageously, the object light source includes a pair of infrared (IR) light emitting diodes (LEDs), and the object light sensor is an IR light sensor. A controller or microprocessor is responsive to the trigger signal and is operative for controlling operation of electrical components of the scan engine and of the object sensing system, and for processing the electrical signal into data corresponding to the target.

In one embodiment where the scan engine is laser-based, the reading light source is a laser for emitting a laser beam. A focusing lens assembly is operative for focusing the laser beam to form a beam spot in a range of working distances relative to the window. An electrically energizable scan component is operative for repetitively scanning the beam spot across the target in a scan pattern across the target. The reading light detector is a photodetector for detecting laser light returning from the target over a reading field of view, and for converting the return laser light into the electrical signal.

In another embodiment where the scan engine is imager-based, the reading light source is an illuminating light source for illuminating the target with illumination light, and the reading light detector is a solid-state, image sensor mounted on a printed circuit board and having an array of pixels for detecting the illumination light returning from the target. An imaging lens assembly is operative for capturing the return illumination light over a reading field of view and over a range of working distances relative to the window. Preferably, the illuminating light source includes two pairs of light emitting diodes (LEDs), each pair being mounted on the printed circuit board at opposite sides of the image sensor. Preferably, the IR LEDs are also mounted on the printed circuit board at opposite sides of the image sensor, and the IR light sensor is mounted on the printed circuit board between the IR LEDs and below the image sensor.

As described above, a portion of the object sensing light incident on the window is reflected therefrom into the object detection field of view as one or more virtual hot spots that degrade the object sensor performance. The hot spot problem is exacerbated by any fold minors advantageously arranged in the reading path between the window and the reading light detector. These fold mirrors constitute additional surfaces from which a portion of the object sensing light may be reflected therefrom back into the object detection field of view to create additional virtual hot spots. These hot spots, also known as glare, are specular light, which can overload, saturate, and "blind" the object sensor, thereby degrading the object sensor performance.

One aspect of this invention is to optically modify the object detection field of view to prevent the virtual hot spots from being detected by the object light sensor. This is advantageously achieved by mounting a uniquely configured optical element, such as an aperture stop, in the object detection path. Thus, the aperture stop is advantageously configured with opaque wall portions that bound a central opening between a pair of opposite end openings. Each end opening has a predetermined vertical height dimension, and the central opening has a reduced vertical height dimension that is less than the predetermined vertical height dimension. The opaque wall portions bound the central opening and extend toward, but terminate short of, each other. The greater predetermined vertical height dimension of each end opening enables each IR LED to have a correspondingly greater active object triggering volume. The reduced vertical height dimension of the central opening effectively blocks the hot spots. Rather than being formed with through openings, the uniquely configured optical element could be configured with light-transmissive portions and strategically placed light-obscuring portions. For example, a light-transmissive plate could be coated with opaque areas, in which case, the light-transmissive portions of the plate serve as the equivalent to the aperture of the aperture stop, and the opaque areas or light-obscuring portions on the plate serve as the equivalent to the opaque walls bounding the openings of the aperture stop. Other optical elements could advantageously include light-blocking baffles mounted in the object detection path and positioned to block the aforementioned hot spots from impinging on the object sensor.

Another feature of the present invention resides, briefly stated, in a method of electro-optically reading targets associated with objects, the method being performed by supporting a light-transmissive window on a housing, directing reading light from a reading light source through the window at a target for return therefrom during reading, detecting return reading light returned from the target along a reading path through the window over a reading field of view of a reading light detector during reading, generating an electrical signal indicative of the detected return reading light, sensing an object associated with the target, generating a trigger signal to initiate the reading, the sensing step being performed by directing object sensing light from an object light source through the window at the object for return therefrom, and by detecting return object sensing light returned from the object along an object detection path through the window over an object detection field of view of an object light sensor, a portion of the object sensing light incident on the window being reflected therefrom into the object detection field of view as a virtual hot spot that degrades the object light sensor performance, processing the electrical signal into data corresponding to the target in response to the trigger signal, and optically modifying the object detection field of view, preferably by positioning an aperture stop in the object detection path, to prevent the virtual hot spot from degrading object light sensor performance.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
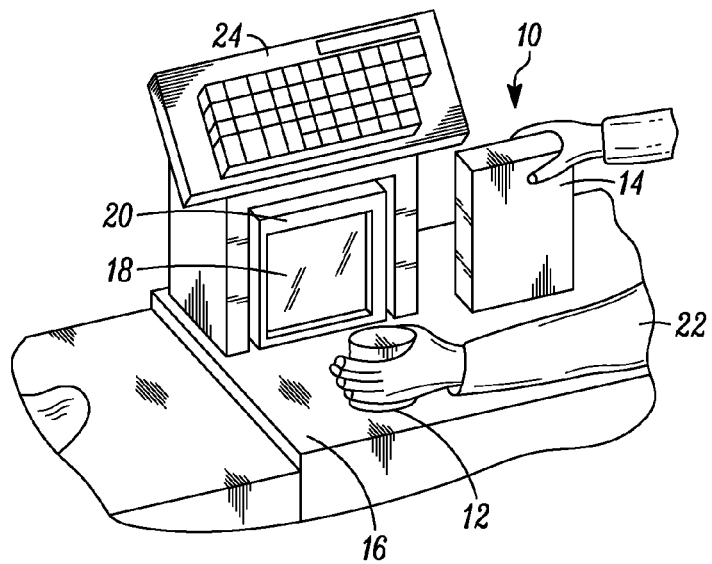
FIG. 1 is a perspective view of an electro-optical workstation configured as a vertical slot scanner in accordance with this invention.

Reference numeral 10 in FIG. 1 generally identifies an electro-optical reading workstation for processing transactions at a checkout counter of a retail site at which objects or products, such as a can 12 or a box 14, each associated with, and preferably bearing, a target such as a bar code symbol, are processed for purchase. The counter includes a countertop 16 across which the products are presented or slid at a swipe speed past and across a generally vertical or upright, generally planar, light-transmissive window 18 of a box-shaped housing of an imaging reader 20 configured as a vertical slot scanner mounted on the countertop 16. A user, preferably a checkout operator 22, is located at one side of the countertop 16, and the reader 20 is located at the opposite side. A cash/credit register 24 is located within easy reach of the operator 22. The reader 20 is portable and lightweight and may be picked up from the countertop 16 by the operator 22, and the window 18 may be aimed at a symbol, preferably on a product too heavy or too large to be easily positioned on the countertop 16 in front of the reader 20 in the workstation mode.

Figure 2:
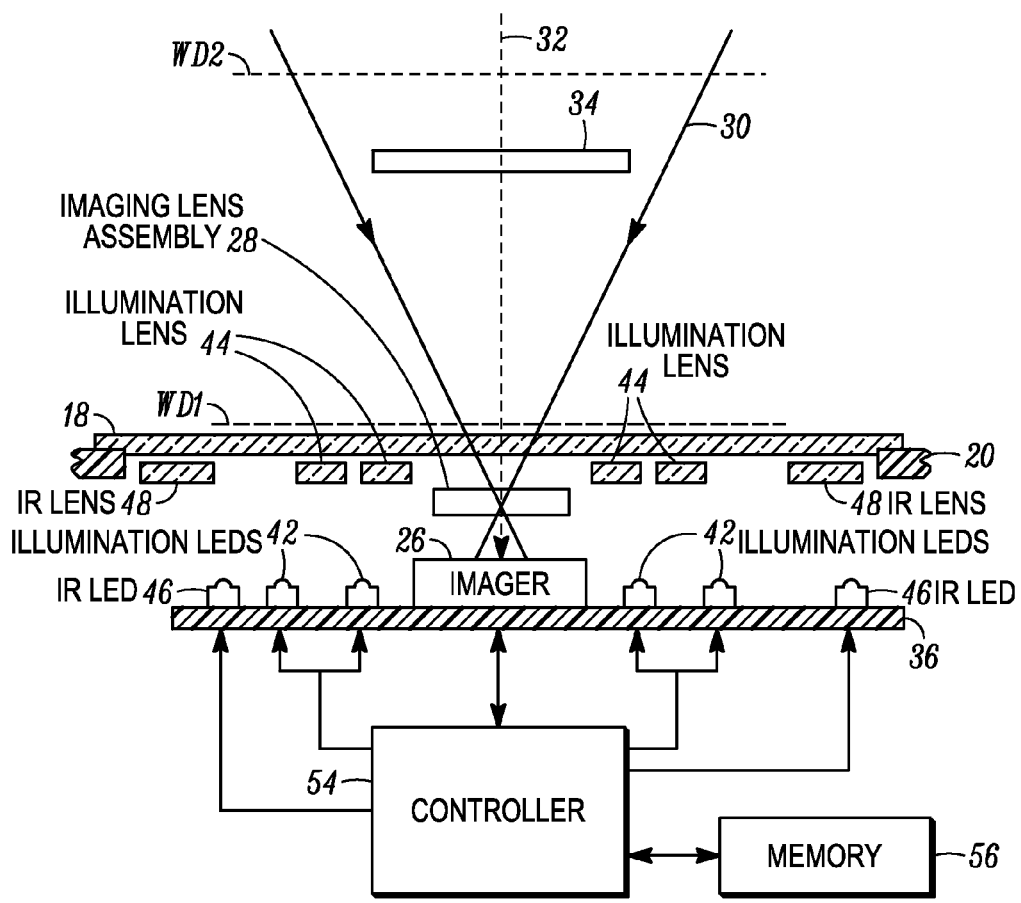
FIG. 2 is a part-schematic, part-diagrammatic view depicting various components of the workstation of FIG. 1.

The imaging reader 20 includes, as shown in FIG. 2, an image sensor or imager 26 mounted on a printed circuit board (PCB) 36, and an imaging lens assembly 28 mounted in front of the imager 26. The imager 26 is a solid-state device, for example, a CCD or a CMOS imager and has a linear or area array of addressable image sensors or pixels, preferably of submegapixel or supermegapixel size, having a reading field of view 30 that diverges away from the window 18 in both horizontal and vertical directions. The imaging lens assembly 28 has an optical axis 32 generally perpendicular to the window 18 and is operative for capturing light through the window 18 from a target, for example, a one- or two-dimensional symbol 34, located in a range of working distances along the optical axis 32 between a close-in working distance (WD1) and a far-out working distance (WD2), and for projecting the captured light onto the imager 26. In a preferred embodiment, WD1 is about two inches from the imager 26 and generally coincides with the window 18, and WD2 is about eight inches or more from the window 18.

An illumination light system is also mounted in the reader 20 and preferably includes a plurality of illumination light sources, e.g., two pairs of light emitting diodes (LEDs) 42, mounted on the PCB 36 and arranged at opposite sides of the imager 26. Two pairs of illumination lenses 44 are mounted in front of the illumination LEDs 42 to uniformly illuminate the target symbol 34 with illumination light.

An object sensing system is also mounted in the reader 20 and is operative for sensing an object 12, 14 associated with the target symbol 34, and for generating a trigger signal to initiate the reading. The object sensing system includes an object light source, preferably a pair of infrared (IR) light emitting diodes (LEDs) 46 mounted on the PCB 36 at opposite sides of the imager 26, and a pair of IR lenses 48 mounted in front of the IR LEDs 46, and together operative for directing object sensing IR light, which is invisible to the human eye, in a wavelength range from about 700 nm to about 1100 nm, over a viewing angle through the window 18 at the object 12, 14 for return therefrom, and an object light sensor 50 (see FIG. 3) for detecting return object sensing IR light returned from the object 12, 14 along an object detection path through the window 18 over an object detection field of view 40 (shown in FIG. 4 by hatched lines).

Figure 3:
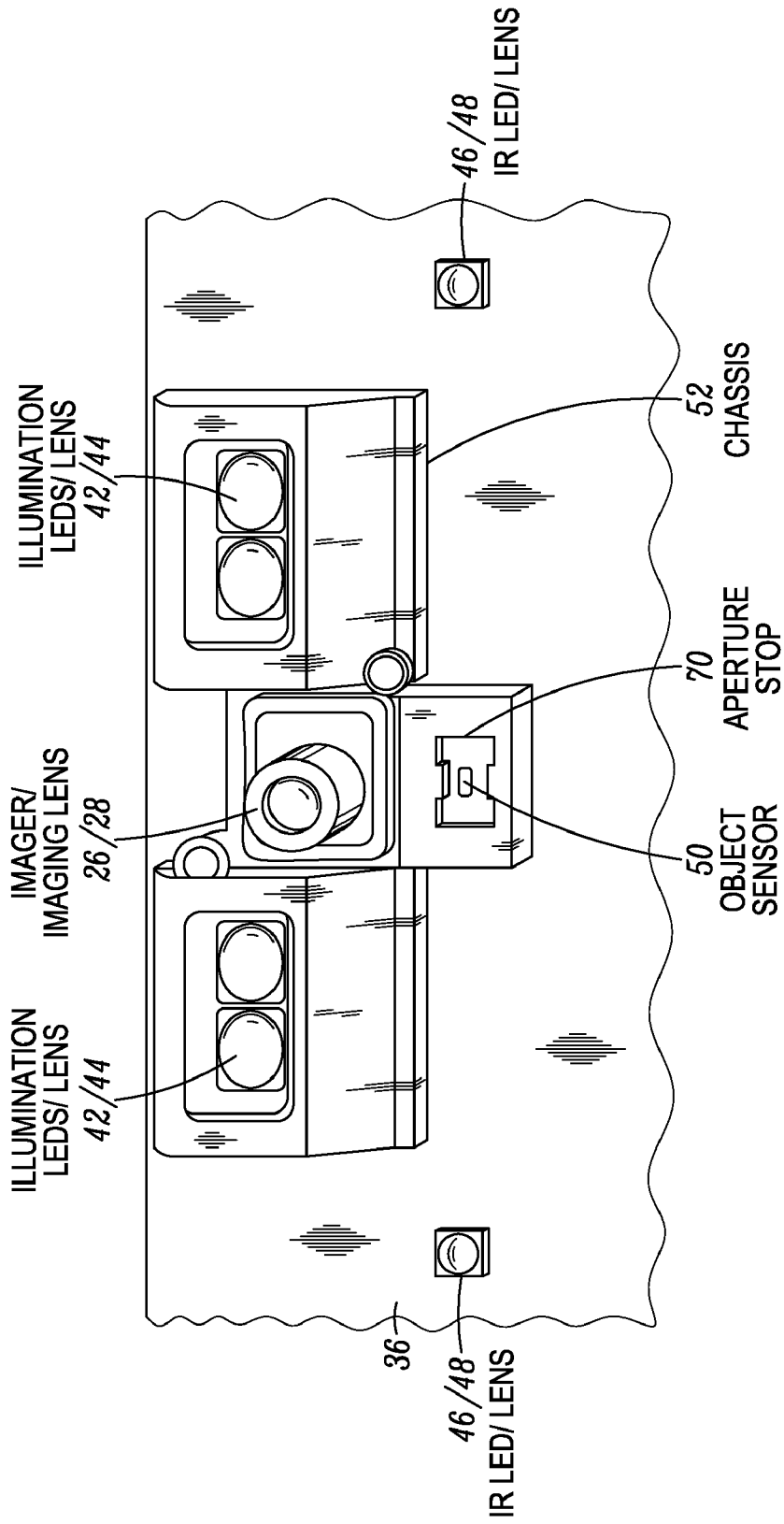
FIG. 3 is a broken-away, enlarged, perspective view depicting some of the components of FIG. 2.

The viewing angle of the IR LEDs 46 is approximately equal to the object detection field of view of the IR object sensor 50 for better system efficiency and pointing in the direction of the object of interest. The object detection field of view substantially overlaps the reading field of view 30. As best seen in FIG. 3, the object IR light sensor 50 is mounted on the PCB 36 between the IR LEDs 46 and below the imager 26. Other locations for the object IR light sensor 50 are contemplated. Also, all of the lenses 28, 44, and 48 are supported by a chassis 52 above the PCB 36 on which the imager 26, the illumination LEDs 42 and the IR LEDs 46 are mounted. The IR object sensor 50 may have a daylight filter to improve the signal-to-ambient light ratio for better performance. The daylight filter substantially blocks visible light in the range from about 350 nm to about 700 nm and lets the IR light, e.g., at about 840 nm, pass. A narrow bandpass filter whose bandwidth corresponds to the wavelength of the IR LEDs 46 could also be beneficial.

Returning to FIG. 2, the imager 26, the illumination LEDs 42 and the IR LEDs 46 are operatively connected to a controller or programmed microprocessor 54 operative for controlling the operation of these electrical components. A memory 56 is connected and accessible to the controller 54. Preferably, the controller 54 is the same as the one used for decoding light scattered from the target symbol 34 and for processing the captured target symbol images.

In operation, the controller 54 sends a command signal to energize the object sensing system to detect whether the object 12, 14 has entered the workstation from either the right or left sides thereof. If so, the trigger signal is generated to advise the controller 54 to send a command signal to energize the illumination system to pulse the illumination LEDs 42 for a short time period of, for example, 500 microseconds or less, and to energize the imager 26 to collect illumination light reflected and/or scattered from the target symbol 34 substantially only during said time period. A typical imager needs about 16-33 milliseconds to read the entire target image and operates at a frame rate of about 30-60 frames per second.

The imager 26 itself advantageously has a global electronic shutter in which all the pixels are simultaneously exposed for light capture. Most CCD arrays are designed with a global electronic shutter. A typical CMOS array is designed with a rolling electronic shutter in which different pixels are exposed at different times. If a CMOS array is used, then it should preferably be designed to allow a global electronic shutter.

The target symbol 34 may be a one- or a two-dimensional symbol whose use is becoming more widespread, especially in manufacturing environments and in package delivery. Sometimes, the target symbol 34 includes various lengths of truncated symbols of the type frequently found on frequent shopper cards, coupons, loyalty cards, in which case the area imagers can read these additional symbols.

FIG. 1 depicts an imager-based vertical slot scanner 20. Other types of imager-based readers, such as a dual window, bi-optical workstation can be used. Other housings having different shapes, with one or more windows, are also within the spirit of this invention. For example, a stand-alone reader having a gun-shaped housing is another advantageous configuration. In addition, this invention is not intended to be limited solely to imager-based readers, but can also encompass laser-based readers.

Thus, broadly speaking, the workstation includes a generic scan module mounted in the reader 20. The scan module includes a reading light source for directing reading light through the window 18 at the target 34 for return therefrom during reading; and a reading light detector for detecting return reading light from the target 34 along a reading path through the window 18 over a reading field of view during reading, and for generating an electrical signal indicative of the detected return reading light.

Where the scan engine is laser-based, the reading light source is a laser for emitting a laser beam. A focusing lens assembly is operative for focusing the laser beam to form a beam spot in a range of working distances relative to the window 18. An electrically energizable scan component is operative for repetitively scanning the beam spot across the target 34 in a scan pattern across the target 34. The reading light detector is a photodetector for detecting laser light returning from the target 34 over a reading field of view, and for converting the return laser light into the electrical signal. As described above, where the scan engine is imager-based, the reading light source is the illuminating light source 42 for illuminating the target 34 with illumination light, and the reading light detector 26 is the image sensor 26.

As also described above, a portion of the object sensing IR light incident on the window 18 is reflected therefrom into the object detection field of view 40 as one or more virtual hot spots (depicted as circular spots in FIG. 4) that degrade the performance of the object sensor 50. The hot spot problem is exacerbated by a plurality of fold mirrors 58, 60 advantageously arranged in the reading path between the window 18 and the imager 26. As described above, it is desirable to have the active reading field of view 30 relatively large at a near working distance or a close proximity to the window 18 so that the reading field of view 30 covers the entire target 34. At farther working distances, it is preferred to have the reading field of view diverge slowly. A reading field of view 30 with such characteristics is advantageously achieved by making the internal optical path between the imager 26 and the window 18 relatively long to preserve a small compact volume for the workstation, and this is typically obtained by inserting the fold mirrors 58, 60 in this internal optical path. However, these fold mirrors 58, 60 constitute additional surfaces from which a portion of the object sensing light may be reflected therefrom back into the object detection field of view 40 to create additional virtual hot spots. These hot spots, also known as glare, are specular light, which can overload, saturate, and "blind" the object sensor 50, thereby compromising its capability 34.

Figure 4:
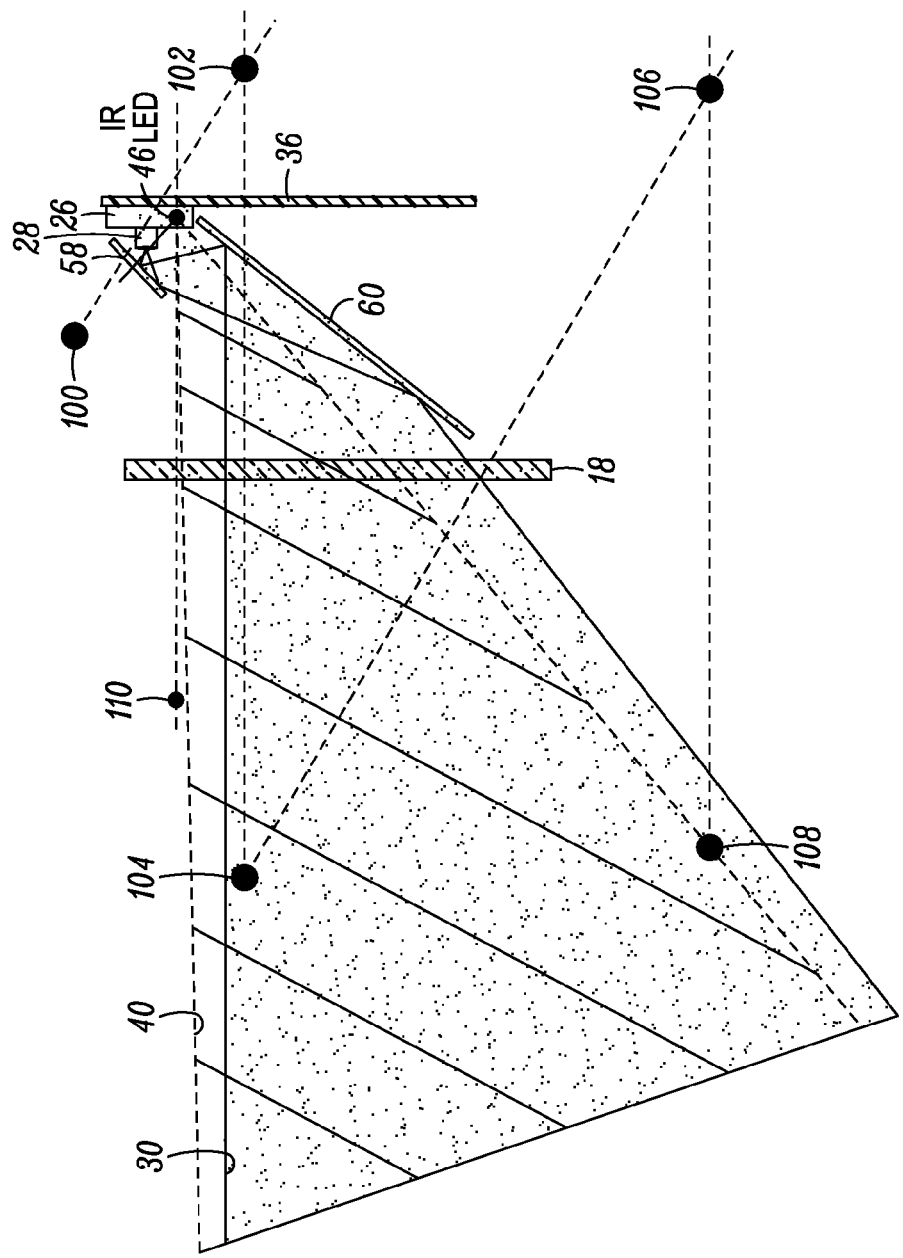
FIG. 4 is a side view of some of the components of FIG. 3 and depicts various hot spots whose deleterious effects are to be prevented in accordance with this invention.

With the aid of FIG. 4, a first hot spot 100 is a virtual mirror image of each IR LED 46 and is mirror symmetrically arranged relative to the fold mirror 58. A second hot spot 102 is a virtual mirror image of each first hot spot 100 and is mirror symmetrically arranged relative to the fold mirror 60. A third hot spot 104 is a virtual mirror image of each second hot spot 102 and is mirror symmetrically arranged relative to the window 18. A fourth hot spot 106 is a virtual mirror image of each third hot spot 104 and is mirror symmetrically arranged relative to the fold mirror 60. A fifth hot spot 108 is a virtual mirror image of each fourth hot spot 106 and is mirror symmetrically arranged relative to the window 18. A sixth hot spot 110 is a direct mirror image of each IR LED 46 and is mirror symmetrically arranged relative to the window 18. It is noted that only hot spots 104, 108 are located within the reading field of view 30, which is speckled in FIG. 4.

Figure 5:
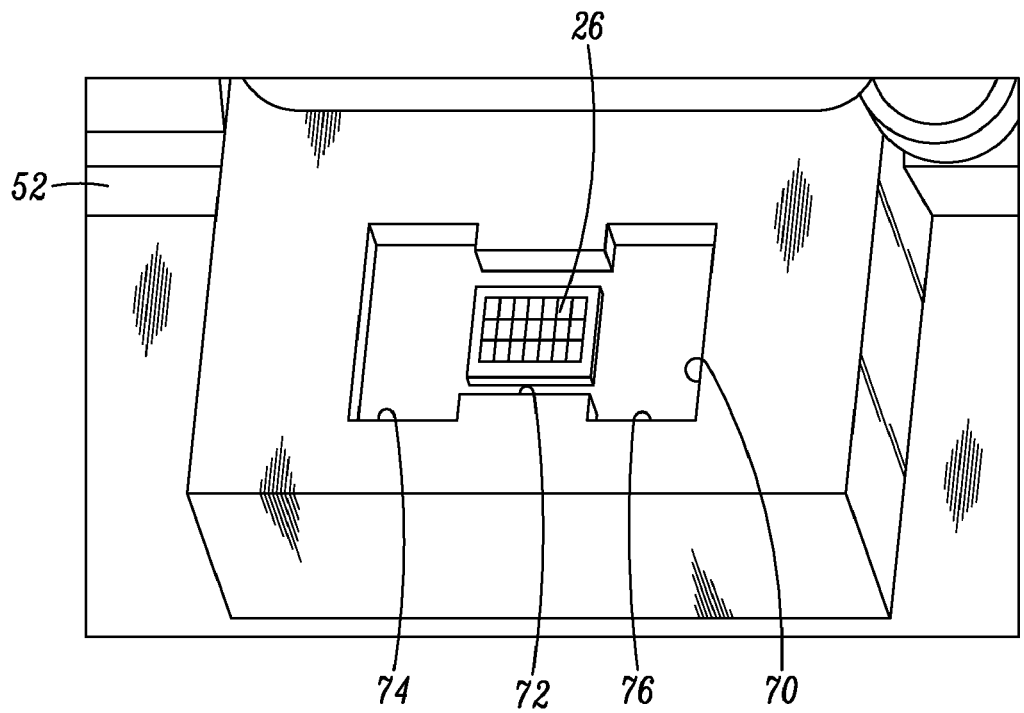
FIG. 5 is an enlarged, perspective view of an aperture stop configured to prevent the deleterious effects of the hot spots depicted in FIG. 4.
Figure 6:
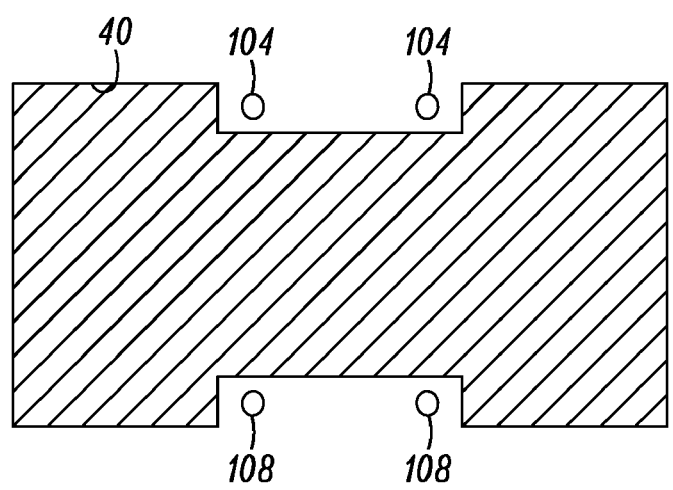
FIG. 6 is an end view diagrammatically depicting the modification of the object detection field of view by the aperture stop of FIG. 5.

One aspect of this invention is to optically modify the object detection field of view 40 to prevent the virtual hot spots 104, 108 from being detected by the object light sensor 50. This is advantageously achieved by mounting a uniquely configured optical element, such as an aperture stop 70 (see FIGS. 3 and 5) in the object detection path. Thus, the aperture stop 70 is configured with opaque wall portions that bound a central opening 72 between a pair of opposite end openings 74, 76. Each end opening 74, 76 has a predetermined vertical height dimension, and the central opening 72 has a reduced vertical height dimension that is less than the predetermined vertical height dimension. The opaque wall portions bound the central opening 72 and extend toward, but terminate short of, each other. The aperture stop 70, as shown, resembles the letter H, but other shapes are encompassed by this invention. The greater predetermined vertical height dimension of each end opening 74, 76 enables each IR LED 46 to have a correspondingly greater active object triggering volume. As shown in FIG. 6, the reduced vertical height dimension of the central opening 72 effectively blocks the hot spots 104, 108.

Rather than being formed with through openings 72, 74, 76, the uniquely configured optical element could be configured with light-transmissive portions and strategically placed light-obscuring portions. For example, a light-transmissive plate could be coated with opaque areas, in which case, the light-transmissive portions of the plate serve as the equivalent to the openings 72, 74, 76 of the aperture stop 70, and the opaque areas or light-obscuring portions on the plate serve as the equivalent to the opaque wall portions bounding the openings 72, 74, 76 of the aperture stop 72. Other optical elements could advantageously include light-blocking baffles mounted in the object detection path and positioned to block the aforementioned hot spots from impinging on the object sensor 50.

It will be understood that each of the elements described above, or two or more together, also may find a useful application in other types of constructions differing from the types described above. For example, the number of illumination LEDs 42 and their location can be different from those illustrated in he drawings; the number of IR LEDs 46 and their location can also be different from those illustrated in he drawings; and more than one object sensor 50 can be employed.

While the invention has been illustrated and described as embodied in minimizing hot spots and specular reflections in electro-optical readers having object sensors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A workstation for electro-optically reading targets associated with objects, comprising:
    a housing having a light-transmissive window;
    a scan module mounted in the housing, the scan module including a reading light source for directing reading light through the window at a target for return therefrom during reading, and a reading light detector for detecting return reading light returned from the target along a reading path through the window over a reading field of view during reading and for generating an electrical signal indicative of the detected return reading light;
    an object sensing system for sensing an object associated with the target, and for generating a trigger signal to initiate the reading, the object sensing system including an object light source for directing object sensing light through the window at the object for return therefrom, and an object light sensor for detecting return object sensing light returned from the object along an object detection path through the window over an object detection field of view, a portion of the object sensing light incident on the window being reflected therefrom into the object detection field of view as a virtual hot spot that degrades object detection by the object light sensor;
    a controller responsive to the trigger signal and operative for processing the electrical signal into data corresponding to the target; and
    an optical element in the object detection path for optically modifying the object detection field of view to prevent the virtual hot spot from being detected by the object light sensor.

2. The workstation of claim 1, wherein the reading light source is an illuminating light source for illuminating the target with illumination light; wherein the reading light detector is a solid-state, image sensor having an array of pixels for detecting the illumination light returning from the target; and wherein the scan module further comprises an imaging lens assembly for capturing the return illumination light over the reading field of view and over a range of working distances relative to the window.

3. The workstation of claim 2, wherein the illuminating light source includes two pairs of light emitting diodes (LEDs), each pair being mounted at opposite sides of the image sensor.

4. The workstation of claim 2, wherein the object light source includes a pair of infrared (IR) light emitting diodes (LEDs) mounted at opposite sides of the image sensor, and wherein the object light sensor is an IR light sensor mounted between the IR LEDS and below the image sensor.

5. The workstation of claim 1, wherein the scan module includes a printed circuit board on which the scan module and the object sensing system are commonly mounted.

6. The workstation of claim 1; and further comprising a plurality of fold minors arranged in the reading path between the window and the reading light detector, and operative for folding the return reading light.

7. The workstation of claim 1, wherein the object sensing system and the scan module are mounted inside the housing at different heights.

8. The workstation of claim 1, wherein the optical element is an aperture stop having opaque wall portions bounding a central opening between a pair of opposite end openings, and wherein each end opening has a predetermined height, and wherein the central opening has a reduced height that is less than the predetermined height.

9. The workstation of claim 8, wherein the opaque wall portions that bound the central opening extend toward, but terminate short of, each other.

10. The workstation of claim 1, wherein the window is substantially planar, and wherein the housing supports the window in a substantially upright plane.

11. A workstation for electro-optically reading targets associated with objects, comprising:
    a housing for supporting a generally planar, light-transmissive window in a substantially upright plane;
    a scan module mounted in the housing, the scan module including a reading light source for directing reading light through the window at a target for return therefrom during reading, and a reading light detector for detecting return reading light returned from the target along a reading path through the window over a reading field of view during reading and for generating an electrical signal indicative of the detected return light;
    an object sensing system for sensing an object associated with the target, and for generating a trigger signal to initiate the reading, the object sensing system including an object light source for directing object sensing light through the window at the object for return therefrom, and an object light sensor for detecting return object sensing light returned from the object along an object detection path through the window over an object detection field of view, a portion of the object sensing light incident on the window being reflected therefrom into the object detection field of view as a pair of virtual hot spots that degrade object detection by the object light sensor;
    a controller responsive to the trigger signal and operative for processing the electrical signal into data corresponding to the target; and
    an optical element in the object detection path for optically modifying the object detection field of view to prevent the virtual hot spots from being detected by the object light sensor, the optical element having light-transmissive portions for enabling the return object sensing light to impinge on the object sensor, and light-obscuring portions for preventing the hot spots from impinging on the object sensor.

12. A method of electro-optically reading targets associated with objects, comprising the steps of:

supporting a light-transmissive window on a housing;

directing reading light from a reading light source through the window at a target for return therefrom during reading, detecting return reading light returned from the target along a reading path through the window over a reading field of view of a reading light detector during reading, and generating an electrical signal indicative of the detected return light;

sensing an object associated with the target, and generating a trigger signal to initiate the reading, the sensing step being performed by directing object sensing light from an object light source through the window at the object for return therefrom, and by detecting return object sensing light returned from the object along an object detection path through the window over an object detection field of view of an object light sensor, a portion of the object sensing light incident on the window being reflected therefrom into the object detection field of view as a virtual hot spot that degrades object detection by the object light sensor;

processing the electrical signal into data corresponding to the target in response to the trigger signal; and optically modifying the object detection field of view to prevent the virtual hot spot from being detected by the object light sensor.

13. The method of claim 12, wherein the reading light source is an illuminating light source for illuminating the target with illumination light; wherein the reading light detector is a solid-state, image sensor having an array of pixels for detecting the illumination light returning from the target; and further comprising the step of capturing the return illumination light over the reading field of view and over a range of working distances relative to the window.

14. The method of claim 13, wherein the illuminating light source includes two pairs of light emitting diodes (LEDs); and the step of mounting each pair at opposite sides of the image sensor.

15. The method of claim 13, wherein the object light source includes a pair of infrared (IR) light emitting diodes (LEDs); and the step of mounting the IR LEDs at opposite sides of the image sensor, and wherein the object light sensor is an IR light sensor; and the step of mounting the IR light sensor between the IR LEDS and below the image sensor.

16. The method of claim 12; and the step of commonly mounting the reading light source, the reading light detector, the object light source and the object light sensor on a printed circuit board.

17. The method of claim 12; and further comprising the step of arranging a plurality of fold mirrors in the reading path between the window and the reading light detector for folding the return reading light.

18. The method of claim 12, wherein the optically modifying step is performed by mounting an optical element in the object detection path, and configuring the optical element with light-transmissive portions for enabling the return object sensing light to impinge on the object sensor, and light-obscuring portions for preventing the hot spots from impinging on the object sensor.

19. The method of claim 18, and configuring the optical element as an aperture stop with opaque wall portions bounding a central opening between a pair of opposite end openings, and wherein each end opening is configured with a predetermined height, and wherein the central opening is configured with a reduced height that is less than the predetermined height.

20. The method of claim 19, and configuring the opaque wall portions that bound the central opening to extend toward, but to terminate short of, each other.

\* \* \* \* \*

UNITED STATES PATENT AND TRADEMARK OFFICE
CERTIFICATE OF CORRECTION

PATENT NO. : 8,313,033 B1  
APPLICATION NO. : 13/222264  
DATED : November 20, 2012  
INVENTOR(S) : Vinogradov et al.

Page 1 of 2

It is certified that error appears in the above-identified patent and that said Letters Patent is hereby corrected as shown below:

In the Specifications:

In Column 3, Line 18, delete "minors" and insert -- mirrors --, therefor.

In Column 4, Line 19, delete "minors" and insert -- mirrors --, therefor.

In Column 8, Line 10, delete "minors" and insert -- mirrors --, therefor.

In Column 8, Line 11, delete "minors" and insert -- mirrors --, therefor.

In Column 8, Line 19, delete "minor" and insert -- mirror --, therefor.

In Column 8, Line 20, delete "minor" and insert -- mirror --, therefor.

In Column 8, Line 21, delete "minor 58." and insert -- mirror 58. --, therefor.

In Column 8, Line 23, delete "minor 60." and insert -- mirror 60. --, therefor.

In Column 8, Line 25, delete "minor" and insert -- mirror --, therefor.

In Column 8, Line 27, delete "is minor" and insert -- is mirror --, therefor.

In Column 8, Line 28, delete "fold minor" and insert -- fold mirror --, therefor.

In Column 8, Line 28, delete "minor" and insert -- mirror --, therefor.

In Column 8, Line 29, delete "minor" and insert -- mirror --, therefor.

In Column 8, Line 31, delete "minor" and insert -- mirror --, therefor.

In Column 9, Line 6, delete "he" and insert -- the --, therefor.

In Column 9, Line 7, delete "he" and insert -- the --, therefor.

Signed and Sealed this  
Twenty-first Day of May, 2013

Teresa Stanek Rea  
*Acting Director of the United States Patent and Trademark Office*

CERTIFICATE OF CORRECTION (continued)
U.S. Pat. No. 8,313,033 B1

In the Claims:

In Column 10, Line 9, in Claim 4, delete "LEDS" and insert -- LEDs --, therefor.

In Column 10, Line 13, in Claim 6, delete "1;" and insert -- 1, --, therefor.

In Column 10, Line 14, in Claim 6, delete "minors" and insert -- mirrors --, therefor.

In Column 12, Line 10, in Claim 15, delete "LEDS" and insert -- LEDs --, therefor.

In Column 12, Line 11, in Claim 16, delete "12;" and insert -- 12, --, therefor.

In Column 12, Line 15, in Claim 17, delete "12;" and insert -- 12, --, therefor.